United States Patent [19]
Asai et al.

[11] 3,886,226
[45] May 27, 1975

[54] POLYURETHANE COMPOSITION

[75] Inventors: Kiyotsugu Asai, Kawasaki;
Toshihiko Kawabata; Koichi Sakai,
both of Tokyo; Kiyo Fukuda,
Yokohama; Seiji Nagahisa,
Kawasaki; Toshiyuki Ichikawa,
Tokyo, all of Japan

[73] Assignee: **Mitsui Toatsu Chemicals,
Incorporated,** Tokyo, Japan

[22] Filed: Feb. 20, 1973

[21] Appl. No.: 333,540

[30] Foreign Application Priority Data
Mar. 28, 1972 Japan.............................. 47-30283

[52] U.S. Cl. ............... 260/77.5 AM; 117/124 E;
260/75 NH; 260/858
[51] Int. Cl............................................ C08g 22/04

[58] Field of Search ....... 260/75 NH, 77.5 AM, 858

[56] References Cited
UNITED STATES PATENTS
2,929,800  3/1960  Hill, Jr. .............................. 260/77.5
3,711,445  1/1973  Chu et al. ................... 260/77.5 AM

*Primary Examiner*—Melvin I. Marquis
*Attorney, Agent, or Firm*—Fisher, Christen & Sabol

[57] ABSTRACT

A thermoplastic polyurethane composition containing the reaction product of an aminosilane compound with an isocyanate is applied onto the surface of glass to form a transparent layer of film firmly adhered to said surface, thereby preventing, upon breakage of the glass bottles, glass pieces from scattering.

4 Claims, No Drawings

POLYURETHANE COMPOSITION

BACKGROUND OF INVENTION

The present invention relates to a thermoplastic polyurethane composition which is firmly adhered onto the surface of glass to form a transparent layer of film, whereby scattering of glass pieces upon breakage of glass bottles can be prevented.

Problems have been encounted regarding hazards to the human body due to flying pieces of glass upon breakage of a glass bottle, particularly in handling carbonated beverages bottled with high internal pressure. For example, the method is known wherein a layer of film consisting of a polymeric material such as polyvinyl chloride, polyester and polyurethane is closely bonded to the surfaces of a glass bottle with an adhesive agent used as an intermediate layer. In general, protective coatings for glass bottles are required to satisfy the following properties:

1. Adhesiveness to glass
2. Suitable degree of flexibility for preventing scattering upon breakage of a glass bottle,
3. Sufficient resistance to hot water and to hot alkali when subjected to the steps of washing and disinfecting a glass bottle,
4. Lubricity properties in a manufacturing line,
5. Sufficient hardness, strength, scratching resistance characteristics, abrasion resistance, weather resistance and fungus resistance when handled in the manufacturing line and in transportation,
6. Being colorless and transparent in order not to spoil the appearance of the coated glass product, and
7. Nontoxicity.

So far it has been thought impossible to satisfy the enumerated properties using a single protective layer, and it has been the general practice to employ more complex methods wherein a primer is first applied to improve the bond strength to the surface of glass, an intermediate layer with relative high flexibility then applied and finally a top layer applied using a thermosetting resin with high hardness, strength and resistance to hot alkali as a two-component coating composition. These methods, however, have the disadvantage, besides complexity in their application steps, that due to the use of a thermosetting resin of the two-component type as a top layer, the shelf life after mixing the two components, i.e. the period of time during which application of the mixture is possible, is short resulting in uneven coating and considerable loss of the components by setting before use.

It is known that a polyurethane elastomer obtained by reacting in a solvent a polyisocyanate, a polyol and a low molecular weight chainelongating agent exhibits appropriate characteristics to form a rigid, tough film, but that it has extremely poor adhesion properties to other materials in particular to glass due to its very high cohesive force. It is also known that aminosilane compounds can be utilized for the purpose of improvement in the mechanical and electrical properties of a fiber reinforced synthetic resin or in adhesion properties of a painting composition and the like. When a known amino silane compound is used for the purpose of improving adhesion properties of polyurethane, for example as a primer, however, the resulting bonding strength will be inadequate, and when it is used in admixture with the polyurethane for the same purpose there is a drawback, besides unsatisfactory bonding strength, that the polyurethane film formed after application becomes turbid thus impairing the desired transparency.

SUMMARY OF THE INVENTION

As a result of our extensive investigation in improvement of the adhesiveness of a polyurethane elastomer having suitable characteristics for forming a rigid tough film to the surface of glass without impairing its transparency, we have found that the above drawbacks can be overcome by the use of an aminosilane compound after effecting the reaction of the same with an isocyanate, as distinguished from the use of the aminosilane compound as a simple primer or in simple admixture with a polyurethane elastomer, and reached the present invention.

Thus, the present invention is directed to a polyurethane composition adapted for use in forming a transparent layer of film firmly adhered onto the surface of glass, characterized by containing the reaction product of an aminosilane compound with an isocyanate. The present invention includes the following three embodiments, wherein the objects of the invention can be attained.

The first embodiment of the invention involves the polyurethane composition obtained by reacting in a solvent a polyisocyanate, a polyol, a low molecular weight chain-elongating agent and an aminosilane compound. By applying this polyurethane composition onto the surface of glass, there can be formed a transparent film layer firmly adhering to the surface.

The second embodiment of the invention involves the polyurethane composition obtained by mixing an adhesive composition prepared by reacting in a solvent an aminosilane compound with an isocyanate, with a polyurethane elastomer prepared by reacting in a solvent a polyisocyanate, a polyol and a low molecular weight chain elongating agent. Also in the case of this composition, the same effect as in the first embodiment can be attained by applying it onto the surface of glass.

The third embodiment of the invention involves the method wherein a polyurethane elastomer obtained by reacting in a solvent a polyisocyanate, a polyol and a low molecular weight chain elongating agent is applied onto the surface of glass with an adhesive composition, used as a primer, said composition being obtained by reacting in a solvent an aminosilane compound with an isocyanate. Also by this method, the same effect as in the above two embodiments can be attained.

DESCRIPTION OF THE INVENTION

Polyisocyanates which can be used in accordance with the present invention may be any polyisocyanates usually used in the manufacture of polyurethanes, that is, 2,4-tolylenediisocyanate, 2,6-tolylenediisocyanate, 4,4-diphenylmethanediisocyanate, 3,3-dimethyl-4, 4'-diphenylmethanediisocyanate, 1,5-naphthylenediisocyanate, 1,6-hexamethylenediisocyanate, and 4,4'-dicyclohexylmethanediisocyanate, and these polyisocyanates may be used either alone or in mixtures thereof. The preferred amount of those used is within the range of from 0.95 to 1.05 in terms of an equivalent ratio of isocyanate group to the active hydrogen group of polyols and low molecular weight chainelongating agents.

Polyols useful in the present invention include polyoxyalkylene glycols selected from the group consisting of polyoxypropylene glycols and polyoxypropylene—polyoxyethylene glycol copolymers each having a molecular weight of from 400 to 3,000 as well as polyoxytetramethylene glycols having a molecular weight of from 700 to 3,000; and polyester glycols selected from the group consisting of polyethylene adipates, polydiethylene adipates, polyproylene adipates, polyethylene-butylene adipates, polybutylene adipates and polyhexylene adipates each having a molecular weight of from 700 to 3,000 and hydroxyl groups at the terminals of the molecules.

Low molecular weight chain-elongating agents useful in the present invention include those low molecular weight chain elongating agents known to be useful in the manufacture of polyurethane elastomers, that is, glycols, amino-alcohols and diamines, which may be used either alone or in mixture. The amount of these agents used is usually not higher than 10.0 equivalents relative to the polyol reactant.

The glycols include ethylene glycol, propylene glycol, 1,3-butylene glycol, 1,4-butylene glycol, 1,6-hexylene glycol, diethylene glycol, dipropylene glycol and isopropylidene-bis-cyclohexanol. In particular preferred from the standpoints of the strength and resistance to hot alkali is the use of 1,4-butylene glycol, 1,6-hexylene glycol or a mixture of both glycols in an amount of 3.0 to 8.0 in terms of the equivalent ratio to the polyol reactant.

The amino-alcohols include monoethanolamine, diethanolamine, monoisopropanolamine, and diisopropanolamine, and the diamines include ethylene diamine, butylene diamine, 4,4'-diaminodiphenylmethane, 3,3,'-dichloro-4,4'-diaminodiphenylmethane, isophorone diamine and methylenebis-cyclohexylamine.

Aminosilane compounds useful in the present invention include N-β-(aminoethyl)-γ-aminopropyltrimethoxysilane, N-β-(aminoethyl)-γ-aminopropyltriethoxysilane, γ-aminopropyltrimethoxysilane and γ-aminopropyltriethoxysilane. The preferred amount of those used in the range of from 0.01 to 5.0% by weight based on solids content. As used herein and hereinafter the term solids content means the weight of the particular composition after removal therefrom of the solvent.

Solvents which can be used in the present invention are those which are inert to the desired urethane forming reaction, and which have the required solubility for the resulting polymer and the suitable volatility for the particular use. These solvents include dimethylformamide, dimethylacetamide, dimethylsulfoxide, dioxane, tetrahydrofuran, methyl ethyl ketone, ethyl acetate, toluene, xylenes, cellosolve, trichloroethylene (trichlene), tetrachloroethylene (perchlene) and 1, 1, 1-trichloroethane(methylchloroform), and may be used either alone or as mixtures of more than one such solvents. Above all is preferred the use of dimethylformamide.

Isocyanates useful in the present invention include, besides the polyisocyanates as defined above, polyphenylene polymethylene polyisocyanates, phenyl isocyanate, o-(or p-)tolylisocyanate and o-(or p-) chlorophenyl isocyanate. These may be used either alone or as mixtures.

Heretofore polyurethanes have been thought to be of good adhesiveness to metals, glass or the like materials to such an extent that they themselves are used as adhesives therefor, but they have been used either in the form of two-component adhesives where polyisocyanate and polyol components are mixed together just before use or in the form of a prepolymer having isocyanate groups at their terminals. Thus, in either case, their good adhesiveness to the surface of a metal or glass substrate results from chemical bonding of the contained isocyanate groups to the substrate surface. while, in the case of a thermoplastic polyurethane solution, such chemical bonding to the surface of substrate cannot be expected to be formed due to the absence of such isocyanate groups, thus showing extremely poor adhesiveness to other materials, in particular to glass, and as a consequence an appropriate primer becomes necessary in order to expect satisfactory adhesiveness.

Among known primers for improving the bonding strength between a glass substrate and a resin coating are chlorinated rubbers, epoxy resins, polyisocyanates and aminosilane compounds. Although polyurethane elastomers obtained by reacting in a solvent a polyisocyanate, a polyol and a low molecular weight chain-elongating agent, exhibit suitable characteristics for forming a rigid tough film, their use with said primers will not show adequate adhesiveness to glass due to their great cohesive force. Furthermore, when the polyurethane elastomers are used in admixture with these primers, such as aminosilane compounds, there is the disadvantage, besides inadequate adhesiveness of the resulting coating to the substrate, that application onto glass of such an admixture, for example an admixture of a polyurethane elastomer with an aminosilane compound, tends to give rise to turbidity on and in the resulting polyurethane film, thus impairing the desired transparency.

The first embodiment of the present invention is accomplished by effecting in the presence of an aminosilane compound the reaction of a polyisocyanate, a polyol and a low molecular weight chain-elongating agent in a solvent to form a polyurethane elastomer, thus making said aminosilane compound pertain to said reaction. Since the aminosilane compounds have active hydrogens, they are bonded into the main chain by reacting with the polyisocyanate reactant. The time of addition of the aminosilane compound will not make significant differences in characteristics of the resulting compositions. Thus, the addition of the aminosilane compounds can be made at any time before discontinuation of the reaction as described hereinafter.

Although the reaction conditions can vary over a wide range, in usual cases, the amount of solvent used is in the range of from 40 to 80% by weight based on the total weight of the reaction product, the reaction temperature is in the range of from 70° to 90°C and the reaction time is in the range of from 2 to 5 hours. It is convenient to confirm the end of the reaction by means of the viscosity of the reaction product. Thus, when the viscosity has reached the predetermined value, the reaction is discontinued by conventional methods, for example by adding di-n-butylamine to the reaction mixture with the excessive di-n-butylamine subsequently neutralized with acetic anhydride, thus giving a stable polyurethane composition.

In applying the compositions of the present invention onto glass, the compositions as prepared above may be used as such or after dilution with an appropriate solvent to a lower viscosity. The application can be made by any methods including brushing, dipping, screen coating and spray methods. Since the composition of the present invention comprises a thermoplastic polyurethane dissolved in a solvent, i.e. an extremely stable one-component composition, there is no fear of uneveness in coatings obtained after application due to changes of the coatings with time, and of deterioration of the resin solution through hardening, as is the case with two-component type thermosetting resins. After the application, a polyurethane film firmly adhering to the surface of glass can be formed simply by evaporating the solvent. The drying conditions have some effect upon the resulting adhesivess, and preferred condition is drying at 80° to 150°C for 15 to 40 minutes.

If necessary, the compositions according to the invention may contain stabilizers such as ultraviolet absorbers and antioxidants, and known primers, preferably an epoxysilane compound such as γ-glycidoxypropyltrimethoxysilane.

The improved adhesiveness to glass of films formed by application of the polyurethane compositions according to the first embodiment of the invention will be demonstrated by comparison to control runs (see Nos. 1 and 2 in Table 1) and shown in Table 1. The bond strength of the particular film to glass was measured and rated by the following procedure: A polyurethane composition in solution is applied to a glass plate and the coated plate allowed to stand for 30 minutes in a hot air drier at 120°C to evaporate the solvent, wherein the amount of the composition applied is adjusted so as to give, when dried, a film thickness ranging from 100 to 150 microns. The resulting specimen is dipped first in 3.25% aqueous caustic soda solution at 60°C for 10 minutes and then in water at 30°C for 5 minutes. After repeating this dipping procedure ten times, the specimen is freed of moisture by blotting with filter paper.

Another specimen of a similarly coated glass plate is provided on and in its coating film having 1 cm long notches of the depth reaching the surface of the glass plate, and then subjected to the same repetitive dipping as described above.

Measurement of bond strength is effected by providing on and in the film portion to be tested eleven 1 cm-long notches, both lengthwise and breadthwise, each spaced apart 1 mm and having the depth reaching the surface of the glass plate, to make 100 squares. In the case of having made 1 cm long notch before dipping, the squares are so provided that the squares of the notches may involve the notch before dipping. Thereafter a cellophane tape is sticked on the squares and then peeled by pulling manually. The bond strength of the film to the glass plate is rated into three grades according to the number of the squares where the square films are stripped from the glass plate upon peeling the tape.

o No films stripped.
Δ 1 to 10 square films stripped.
x More than 10 square films stripped.

As will be evident from Table 1, in cases where an aminosilane compound is directly applied onto the surface of glass as a primer (No. 1) and where the compound is added to and mixed with a polyurethane solution after discontinuation of the reaction (No. 2), adequate bond strength is not obtainable.

In contrast thereto, when the aminosilane compound is added before or during the reaction in accordance with the first embodiment of the present invention (Nos. 3 through 9), high bond strength is attainable before dipping and retained after repetitive dipping.

Table 1

(The parenthesized numerical numbers in Table 1 correspond to those used as item numbers for Remarks for Table 1.)

| | Starting materials | | | | | Manner in which | Bonding Strength | | |
|---|---|---|---|---|---|---|---|---|---|
| No. | Polyisocyanate | Polyol | Low molecular weight chain-elongating agent | Solvent | Aminosilane compound | the aminosilane compound is added | Before dipping | After dipping | After dipping with notch |
| 1 | MDI(1) | PTG(3) | 1,6 HG (6) | DMF(10) | AEAPM(13) | AEAPM-GOPM (17) mixture previously applied to glass | Δ | Δ | x |
| 2 | MDI | PTG | 1,6 HG | DMF | AEAPM | AEAPM and GOPM added after discontinuing the reaction | x | x | x |
| 3 | MDI | PTG | 1,6 HG | DMF | AEAPM | AEAPM added during the reaction | o | o | o |
| 4 | MDI | PTG | 1,6 HG | DMF | AEAPM | AEAPM added during, and GOPM added after the reaction | o | o | o |
| 5 | MDI | PTG | 1,6 HG | DMF-MEK (11) mixture | APE(14) | APE added before the reaction | o | o | o |
| 6 | MDI | PPG(4) | 1,4 BG(7) | DMF | AEAPE(15) | AEAPE added during the reaction | o | o | Δ |
| 7 | TDI(2) | PTG | 1,6 HG | DMF | APM(16) | APM added before the reaction | o | o | Δ |
| 8 | TDI | PPG | EG(8) | DMF-DO (12) mixture | AEAPE | AEAPE added during the reaction | o | Δ | Δ |
| 9 | MDI | BA(5) | DEG(9) | DMF | APE | APE added during the reaction | o | Δ | x |

Remarks for Table 1:
(1) 4,4'-Diphenylmethane diisocyanate.
(2) 80: 20 Mixture of 2,4-tolylene diisocyanate and 2,6-Tolylene diisocyanate.
(3) Polyoxytetramethylene glycol having a molecular weight of 1,000.
(4) Polyoxypropylene glycol having a molecular weight of 1,000.
(5) Polybutylene adipate having a molecular weight of 1,600.
(6) 1,6-Hexylene glycol.
(7) 1,4-butylene glycol.
(8) Etylene glycol.
(9) Diethylene glycol.
(10) Dimethylformamide.
(11) Methyl ethyl ketone.
(12) Dioxane.
(13) N-β-(Aminoethyl)-γ-aminopropyltrimethoxysilane.
(14) γ-Aminopropyltriethoxysilane.
(15) N-β-(Aminoethyl)-γ-aminopropyltriethoxysilane.
(16) γ-Aminopropyltrimethoxysilane.
(17) γ-Glycidoxypropyltrimethoxysilane.

The second embodiment of the present invention is accomplished by mixing an adhesive composition obtained by reacting in a solvent an aminosilane compound with an isocyanate, with a polyurethane elastomer obtained by reacting in a solvent a polyisocyanate, a polyol and a low molecular weight chain-elongating agent.

From the standpoint of its stability, the adhesive composition preferably contains no free isocyanate groups. On that account, the reaction of an aminosilane compound with an isocyanate is usually effected using the former in excess. Also it is possible, when part of the isocyanate groups left unreacted, to complete the reaction of the residual isocyanate groups by conventional methods, for example, by adding an appropriate monofunctional compound such as ethanol or butylamine.

The reaction of an aminosilane compound with an isocyanate will proceed quite easily and is conveniently effected by bringing both reactants into contact with each other in a solvent inert to the reactants, usually under the following conditions;

Temperatures ranging from 10° to 60°C,
Time ranging from 10 to 100 minutes
Concentrations ranging from 0.1 to 50%.

In some concentrations and according to reactivity of the reactants, the reaction will produce much exothermic heat, so that it is generally preferred to carry out the reaction under cooling in order to keep the reaction temperature in the desired range. According to the particular purpose of use of the adhesive composition, the reaction product may be concentrated or isolated by removing part or all of the solvent, or alternatively diluted with a solvent. As stated above, suitable solvents for this purpose may be selected from any of those which are inert to the aminosilane compounds and isocyanates, according to the particular purpose of use.

The polyurethane elastomer to be mixed with the adhesive composition is prepared by reacting in a solvent a polyisocyanate, a polyol and a low molecular weight chain-elongating agent. The reaction conditions for this preparation are the same as for the preparation of the polyurethane compositions according to the first embodiment of the present invention, except in that no aminosilane compounds are present.

The above described adhesive composition and polyurethane elastomer are mixed together in such proportions that said adhesive composition may be between 0.0001 and 0.05 part, preferably between 0.001 and 0.01 part, per part of said polyurethane elastomer, based on the weight of solids content.

The polyurethane compositions thus obtained can be applied to the surface of glass by the same procedure as described for the polyurethane compositions according to the first embodiment of the present invention.

The third embodiment of the present invention is accomplished by applying a polyurethane elastomer onto the surface of glass using an adhesive composition prepared by reacting in a solvent an aminosilane compound with an isocyanate as a primer. The reaction conditions for the preparation of the adhesive composition and polyurethane elastomer are the same as described in the preparation of the adhesive compositions and polyurethane elastomers according to the second embodiment of the present invention. The manner in which the polyurethane elastomer is applied onto the surface of glass is the same as in the first embodiment of the present invention.

The improved adhesiveness to glass of films formed by application of the polyurethane compositions according to the second embodiment and of the polyurethane elastomers according to the third embodiment of the present invention will be shown in Table 2 in which, for the sake of comparison, two control runs are included (see Nos. 1 and 2 in Table 2). The comparison of the bond strength to glass of the films tested is made in the same manner as employed above for the first embodiment.

As will be evident from Table 2, the adhesiveness to glass, of the films formed in accordance with the second and third embodiment of the present invention is superior to that in the control runs as in the case of the first embodiment of the present invention.

Table 2

(The parenthesized numerical numbers correspond to those used as item numbers for Remarks for Table 2.)

| No. | Starting materials for preparing polyurethane elastomer | | | | Starting materials for preparing adhesive composition | | | Manner in which the adhesive composition is used | Bonding Strength | | |
|---|---|---|---|---|---|---|---|---|---|---|---|
| | Poly-isocyanate | Polyol | Low molecular weight chain-elongating agent | Solvent | Isocyanate | Amino-silane compound | Solvent | | Before dipping | After dipping | After dipping with notch |
| 1 | MDI(1) | PTG(3) | 1,6HG(6) | DMF(10) | — | AEAPM(13) | — | AEAPM-GOPM(17) mixture previously applied as primer to glass | Δ | Δ | X |
| 2 | MDI | PTG | 1,6HG | DMF | — | AEAPM | — | AEAPM and GOPM added after discontinuing the reaction | X | X | X |
| 3 | MDI | PTG | 1,6HG | DMF | OTI(18) | AEAPM | DMF | The adhesive composition previously applied as primer to glass | O | O | O |
| 4 | MDI | PTG | 1,6HG | DMF | OTI | AEAPM | DMF | The adhesive composition mixed with the polyurethane elastomer | O | O | O |
| 5 | MDI | PPG(4) | 1,4BG(7) | DMF-MEK(11) mixture | OTI | APE(14) | DMF | The adhesive composition previously applied as primer to glass | O | O | O |

Table 2—Continued (The parenthesized numerical numbers correspond to those used as item numbers for Remarks for Table 2.)

| No. | Starting materials for preparing polyurethane elastomer | | | | Starting materials for preparing adhesive composition | | | Manner in which the adhesive composition is used | Bonding Strength | | |
|---|---|---|---|---|---|---|---|---|---|---|---|
| | Poly-isocyanate | Polyol | Low molecular weight chain-elongating agent | Solvent | Isocyanate | Aminosilane compound | Solvent | | Before dipping | After dipping | After dipping with notch |
| 6 | TDI(2) | PTG | 1,6HG | DMF | OTI | APM(16) | DMF | The adhesive composition mixed with the polyurethane elastomer | O | O | Δ |
| 7 | TDI | PPG | EG(8) | DMF-DO(12) mixture | OTI | AEAPE(15) | DMF | The adhesive composition mixed with the polyurethane elastomer | O | Δ | Δ |
| 8 | MDI | BA(5) | DEG(9) | DMF | OTI | APE | DMF | The adhesive composition mixed with the polyurethane elastomer | O | Δ | X |

Remarks for Table 2:
 (1), (2), (3), (4), (5), (6), (7), (8), (9), (10), (11), (12), (13),
 (14), (15), (16) and (17) have the same meaning as defined under Remarks for Table 1.
 (18) o-Tolylisocyanate.

Of polyols used in the preparation of the polyurethane compositions or polyurethane elastomers according to the first or second embodiment of the invention, polyoxytetramethylene glycols and polyester glycols having terminal hydroxyl groups are most preferred because the use of these polyols provides glass bottle substrates with protective coatings exhibiting hardness, strength, scratching resistance, abrasion resistance and weatherability, all sufficient for the coated bottles to undergo handling in the manufacturing line and in transportation.

Unfortunately, however, when a polyurethane composition according to the first embodiment or a polyurethane elastomer according to the second embodiment, both prepared using a poly-oxytetramethylene glycol or a polyester glycol having terminal hydroxyl groups as a polyol reactant, is used and a glass bottle dipped therein and dried in a hot air drier with the bottle rotated, fine waviness will appear on the surface of resin coating on the glass bottle, thus impairing the beauty of the final product. In an attempt to eliminate this drawback, the inventors have made further investigations and reached the extensive invention as follows. Thus we have found that, when a polyurethane composition (or the so called polymer blend) obtained by adding to a polyurethane composition according to the first or second embodiment of the present invention obtained with a polyoxytetramethylene glycol or a polyester glycol having terminal hydroxyl groups as a polyol (hereinafter referred to as Polyurethane composition A), a polyurethane composition according to the first or second embodiment of the present invention obtained with a polyalkylene glycol except the polyoxytetramethylene glycol (hereinafter referred to as Polyurethane composition B), the above described waving phenomenon can be eliminated. It is quite surprising that the drawback of waving encountered in the single use of Polyurethane composition A can be eliminated simply by blending the same with Polyurethane composition B.

The preparation of Polyurethane compositions A and B will be effected in the same manner as described for the first and second embodiments of the present invention, provided that the particular polyol as specified above is used. The amount of Polyurethane composition B added to Polyurethane composition A is, based on solids content, in the range of from 0.0001 part to 1 part per part of the latter.

When the amount of Polyurethane composition B added is below 0.0001 part, the intended elimination of the waving phenomenon will not be achieved.

On the other hand, when the amount of Polyurethane B added is above 1 part, the resulting coating will be descreased in its general physical properties as well as in its alkali resistance and abrasion resistance and as a consequence rendered unsuitable for use in glass bottles for carbonated beverage which have high internal pressure and therefore require higher strength for their containers.

The effects obtained by applying a polyurethane composition, which is prepared by adding Polyurethane composition B to Polyurethane composition A, to a glass bottle or plate are shown in Tables 3 and 4. The manner in which the glass bottle is coated and the method for testing for the waving phenomenon will be described in detail in the following. Thus, a test composition is diluted with an equiamount of dimethylformamide and a glass bottle dipped in the diluted composition, removed therefrom, freed of excess composition, dried in a hot air drier while rotating the bottle (130°C×30 min), removed therefrom and cooled, after which the resulting coated bottle is examined visually. The wave number was counted using a magnifying glass at every 10 mm intervals along the axis along which the wave number is relatively higher, i.e. spaces between the waves are relatively narrower. The coating test with a glass plate is also employed as the method for testing the waving phenomenon which method is simple and convenient for laboratory use, still giving results well correlated to those obtained from the above described method with glass bottles. Thus, a test composition is dropped without dilution onto a 10×10 cm glass plate, dried in a hot air drier for 30 minutes with the plate inclined at an angle of from 5° to 30°, removed therefrom and then examined visually. The manner in which waviness is rated is the same as in the method with glass bottles.

In Tables 3 and 4, results of test with the coating for general physical properties, abrasion resistance and alkali resistance are also included. Test pieces for the test are made as follows: A test composition is applied onto a Teflon sheet at a dry thickness of from 100 to 150 $\mu$ using an applicator, and then dried at 130°C for 1 hour. After drying, the resulting coating film is stripped, from which a test piece is made by punching.

As a result, waviness was observed on the coating film formed by applying Polyurethane composition A alone, while no waviness observed on the coating film formed by applying a composition wherein Polyurethane composition B had been added to Polyurethane composition A in proportions, based on solids content, of 0.0001 part or more Polyurethane composition B per part of Polyurethane composition A.

Table 3

| Run No. | 1 | 2 | 3 | 4 | 5 | 5a | 6 | 7 | 8 |
|---|---|---|---|---|---|---|---|---|---|
| Polyurethane composition A of Example 1 | O | — | O | O | O | O | O | — | — |
| Polyurethane composition A of Example 13 | — | O | — | — | — | — | — | — | O |
| Polyurethane composition B of Example 2 | — | — | O | O | O | O | O | — | O |
| Polyurethane composition B of Example 19 | — | — | — | — | — | — | — | O | — |
| Part of Polyurethane composition B added to 1 part of Polyurethane composition A (based on solids content) | | | 0.00005 | 0.0001 | 0.005 | 0.9 | 1.1 | 0.5 | 0.5 |
| General physical properties | | | | | | | | | |
| Modulus — 100 % (kg/cm²) | 330 | 262 | The same | The same | The same | 290 | 263 | The same | The same |
| Tensile strength (kg/cm²) | 645 | 610 | | | | 530 | 480 | | |
| Elongation (%) | 300 | 380 | | | | 290 | 280 | | |
| Abrasion resistance,[1]—ΔW (mg) | 4 | 4 | As in | As in | As in | 5 | 7 | As in | As in |
| Alkali resistance[2] | | | | | | | | | |
| Modulus — 100 % | 300 | 200 | | | | 220 | 190 | | |
| Tensile strength | 600 | 500 | No. 1 | No. 1 | No. 1 | 430 | 380 | No. 1 | No. 2 |
| Elongation | 200–300 | 300–500 | | | | 255 | 250 | | |
| Waviness[3] | | | | | | | | | |
| Inclined glass plate method | X | X | X | Δ | O | O | O | O | O |
| Glass bottle method | X | X | Δ | O | O | O | O | O | O |

[1] The value is the abrasion loss (—ΔW mg) observed after 1,000 rotations, under load 250g on CS-10 abradant sundle in the Taber type abrasion test (A.S.T.M. D-1044-56).
[2] Dipped in 4 % NaOH solution at 80°C for 3 hours.
[3] O No waves observed; X Many waves (more than two waves/10mm) observed; Δ Fewer waves (one or two waves/10mm) observed.

Table 4

| Run No. | 9 | 10 | 11 | 12 | 13 | 14 | 15 | 16 | 17 | 18 | 19 | 20 |
|---|---|---|---|---|---|---|---|---|---|---|---|---|
| Polyurethane composition A of Example 14 | O | — | — | — | — | O | — | — | — | O | — | — |
| Polyurethane composition A of Example 15 | — | O | — | — | — | — | O | — | — | — | — | — |
| Polyurethane composition A of Example 16 | — | — | O | — | — | — | — | O | — | — | — | — |
| Polyurethane composition A of Example 17 | — | — | — | O | — | — | — | — | O | — | — | — |
| Polyurethane composition A of Example 18 | — | — | — | — | O | — | — | — | — | — | O | O |
| Polyurethane composition B of Example 2 | — | — | — | — | — | O | O | O | O | — | O | — |
| Polyurethane composition B of Example 20 | — | — | — | — | — | — | — | — | — | O | — | O |
| Part of Polyurethane composition B added to 1 part of Polyurethane composition A (based on solids content) | | | | | | 0.005 | 0.005 | 0.005 | 0.005 | 0.005 | 0.005 | 0.005 |
| General physical properties | | | | | | | | | | | | |
| Modulus — 100 % M(kg/cm²) | 250 | The same | The same | The same | 250 | The same | The same | The same | The same | The same | The same | The same |
| Tensile strength (Kg/cm²) | 570 | | | | 620 | | | | | | | |
| Elongation (%) | 290 | | | | 320 | | | | | | | |
| Abrasion resistance[1] —ΔW (mg) | 3 | As in | As in | As in | 3 | As in | As in | As in | As in | As in | As in | As in |
| Alkali resistance[2] | | | | | | | | | | | | |
| Modulus — 100 % | 240 | | | | 180 | | | | | | | |
| Tensile strength | 550 | No. 9 | No. 9 | No. 9 | 490 | No. 9 | No. 9 | No. 9 | No. 9 | No. 9 | No. 13 | No. 13 |
| Elongation | 310 | | | | 340 | | | | | | | |
| Waviness[3] | | | | | | | | | | | | |
| Inclined glass plate method | X | X | X | X | X | O | O | O | O | O | O | O |
| Glass bottle method | X | X | X | X | X | O | O | O | O | O | O | O |

[1], [2], [3]: See foot notes for Table 3.

13

The present invention will be further illustrated by the following Examples in which parts are by weight.

EXAMPLE 1

A mixture of 136 parts of polyoxytetramethylene glycol having a molecular weight of 1,000, 94 parts of 1,6-hexylene glycol, 0.6 part of water, 237 parts of 4,4'-diphenylmethanediisocyanate and 719 parts of dimethyl formamide was heated to 90°C with stirring. The heating at the temperature with stirring was further continued and when the viscosity of the mixture reached its maximum 1.9 part of N-$\beta$-(aminoethyl)-$\gamma$-aminopropyltrimethoxysilane was added. When the viscosity became constant, a small amount of 4,4'-diphenylmethanediisocyanate was added and heating at the same temperature was continued with stirring until the viscosity reached the desired value. Thereafter, 3 parts of dibutylamine were added to and mixed with the resulting mixture whilst stirring, and the excess dibutylamine then neutralized with acetic anhydride. The adhesiveness of the resulting polyurethane solution is shown in No.3 of Table 1.

EXAMPLE 2

The same procedure as in Example 1 was followed using a mixture of 130 parts of polyoxypropylene glycol having a molecular weight of 1,000, 87 parts of 1,4-butylene glycol, 0.6 part of water, 232 parts of 4,4'-diphenylmethanediisocyanate, 699 parts of dimethylformamide, and 1.8 part of N-$\beta$-(aminoethyl)-$\gamma$-aminopropyltriethoxysilane. The adhesiveness of the resulting polyurethane solution is shown in No.6 of Table 1.

EXAMPLE 3

A mixture of 162 parts of polyoxytetramethylene glycol with a molecular weight of 1,000, 112 parts of 1,6-hexyleneglycol, 1.9 part of $\gamma$-aminopropyltrimethoxysilane, 0.7 part of water, 196 part of a 80: 20 mixture of 2,4-tolylenediisocyanate and 2,6-tolylenediisocyanate 1.9 part of dibutyltin dilaurate and 720 parts of dimethyl formamide were heated to 95°C with stirring. When the viscosity of the mixture became constant, a small amount of the tolylenediisocyanate mixture was added, followed by further heating at the temperature with stirring until the viscosity reached the desired value.

The polyurethane solution obtained by subsequently making the same procedure as in Example 1 exhibited the adhesiveness as shown in No. 7 of Table 1.

EXAMPLE 4

A mixture of 146 parts of polybutylene adipate having a molecular weight of 1,600, 29 parts of diethylene glycol, 119 parts of 4,4'-diphenylmethanediisocyanate and 441 part of dimethylformamide was stirred at 90°C for 2 hours and 442 parts of dimethylformamide and 1.8 part of $\gamma$-aminopropyltriethoxysilane were then added, followed by further stirring at 70°C.

The polyurethane solution obtained by subsequently following the same procedure as in Example 1 showed the adhesiveness as indicated in No.9 of Table 1.

EXAMPLE 5

Adhesive Composition 0.05 Gram equivalent of each aminosilane compound as specified in Table 2 and 0.05 gram equivalent of o-tolylisocyanate were reacted in 100 ml of dimethylformamide at 30° to 50°C for 30 minutes.

EXAMPLE 6

Polyurethane Elastomer

A mixture of 135 parts of polyoxytetramethylene glycol having a molecular weight of 1,000, 94 parts of 1,6-hexylene glycol, 0.6 part of water, 237 parts of 4,4'-diphenylmethanediisocyanate, 719 parts of dimethyl formamide were heated to 90°C with stirring. The stirring at the temperature was continued until the viscosity reached the desired value, after which 3 parts of dibutylamine were added to stop the reaction with the excess butylamine neutralized with acetic anhydride to prepare a polyurethane elastomer solution.

EXAMPLE 7

Polyurethane Elastomers

Using a mixture of 130 parts of polyoxypropylene glycol having a molecular weight of 1,000, 87 parts of 1,4-butylene glycol, 0.6 part of water, 232 parts of 4,4'-diphenylmethanediisocyanate, 500 parts of dimethyl formamide and 199 parts of methyl ethyl ketone, the same procedure as in Example 6 was repeated to prepare a polyurethane elastomer solution.

EXAMPLE 8

Polyurethane Elastomer

Using a mixture of 162 parts of polyoxytetramethylene glycol having a molecular weight of 1,000, 112 parts of 1,6-hexylene glycol, 0.7 part of water, 196 parts of a 80:20 mixture of 2,4-tolylene and 2,6-tolyenediisocyanate, 1.9 part of dibutyltin dilaurate and 720 parts of dimethyl formamide, the same procedure as in Example 6 was followed to prepare a polyurethane elastomer solution.

EXAMPLE 9

Polyurethane Elastomer

Using a mixture of 146 parts of polybutylene adipate having a molecular weight of 1,600, 29 parts of diethylene glycol, 119 parts of 4,4'-diphenylmethanediisocyanate and 883 parts of dimethyl formamide, the same procedure as in Example 6 was repeated to prepare a polyurethane elastomer solution.

EXAMPLE 10

100 parts of the polyurethane elastomer solution prepared in Example 6 was mixed with 0.8 parts of the adhesive composition prepared in Example 5 using N-$\beta$-(aminoethyl)-$\gamma$-aminopropyltrimethoxysilane. The adhesiveness of the resulting polyurethane solution is shown in No.4 of Table 2.

EXAMPLE 11

100 parts of the polyurethane elastomer solution of Example 8 was mixed with 0.65 parts of the adhesive composition prepared in Example 5 using γ-aminopropyltrimethoxysilane. The adhesiveness of the resulting polyurethane solution is shown in No.6 of Table 2.

EXAMPLE 12

100 parts of the polyurethane elastomer solution of Example 9 was mixed with 0.37 parts of the adhesive composition prepared in Example 5 using γ-aminopropyltriethoxysilane. The adhesiveness of the resulting polyurethane solution is shown in No. 8 of Table 2.

EXAMPLE 13

A mixture of 146 parts of polybutylene adipate having a molecular weight of 1,600, 77 parts of diethylene glycol, 205 parts of 4,4'-diphenylmethanediisocyanate and 441 parts of dimethyl formamide were stirred at 90°C for 2 hours, and 442 parts of dimethylformamide and 1.8 part of γ-aminopropyltriethoxysilane then added, followed by further stirring at 70°C. After that, the same procedure as in Example 1 was repeated.

EXAMPLE 14

A mixture of 170 parts of polyoxytetramethylene glycol having a molecular weight of 1,500, 65 parts of 1,6-hexylene glycol, 50 parts of 1,4-butylene glycol, 0.7 part of water, 285 parts of 4,4'-diphenylmethanediisocyanate, 600 parts of dimethyl formamide and 300 parts of toluene were heated to 90°C with stirring. After stirring at the temperature for an hour, 2.4 parts of N-B-(aminoethyl)-γ-aminopropyltrimethoxysilane were added. Thereafter the same procedure as in Example 1 was followed.

EXAMPLES 15, 16 and 17

The same procedure as in Example 14 was repeated using as the aminosilane compound the following compounds in the specified amounts.

Example 15: N-β-(aminoethyl)-γ-aminopropyltriethoxysilane, 2.4 parts

Example 16: γ-aminopropyltrimethoxysilane, 2.4 parts

Example 17: γ-aminopropyltriethoxysilane, 2, 4 parts

EXAMPLE 18

1. Polyurethane Elastomer Solution

A mixture of 140 parts of poloxytetramethylene glycol having a molecular weight of 1,500, 107 parts of 1,6-hexylene glycol, 81 parts of 4,4'-diphenylmethanediisocyanate, 123 parts of a 65/35 mixture of 2,4-tolylenediisocyanate/2, 6-tolylenediisocyanate, 1.1 part of water, 460 parts of dimethyl formamide and 230 parts of toluene were heated to 90°C with stirring. After stirring at the temperature for 2 hours, a small amount of 4,4'-diphenylmethanediisocyanate was further added. Subsequently, the same procedure as in Example 6 was followed.

2. Adhesive Composition 11.1 Parts of N-β-(aminoethyl)-γ-aminopropyltrimethoxysilane and 13.3 parts of o-tolylisocyanate were reacted in 100 parts of dimethyl formamide at 30° to 50°C for 30 minutes.

3. Polyurethane Composition

The adhesive composition prepared above under (2) was added to the polyurethane elastomer prepared above under (1), in the solids content ratio of the latter to the former of 1 part:0.008 part.

EXAMPLE 19

The same procedure as in Example 1 was repeated using a mixture of 133 parts of polyoxypropylene-polyoxyethylene glycol having a molecular weight of 2,000, 79 parts of 1,6-hexane diol, 0.6 part of water, 192 parts of 4,4'-diphenylmethanediisocyanate, 606 parts of dimethylformamide and 1.6 part of N-β-(aminoethyl)-γ-aminopropyltriethoxysilane.

EXAMPLE 20

1. Polyurethane Elastomer Solution

The same procedure as in Example 18 was repeated using a mixture of 172 parts of polyoxypropylene glycol having a molecular weight of 1,500, 41 parts of 1,6-hexylene glycol, 31 parts of 1,4-butylene glycol, 0.6 part of water, 205 parts of 4,4'-diphenylmethanediisocyanate, 467 parts of dimethylformamide and 233 parts of toluene.

2. Adhesive Composition

18 Parts of γ-aminopropyltrimethoxysilane and 12.5 parts of 4,4'-diphenylmethanediisocyanate were reacted in 100 parts of dimethyl formamide at 30° to 50°C for 30 minutes.

3. Polyurethane Composition

The adhesive composition obtained above under (2) was added to the polyurethane elastomer solution obtained above under (1), in the solid content ratio of the latter to the former of 1 part:0.008 part.

What is claimed is:

1. A polyurethane mixed composition of:
   A. polyurethane composition A selected from the group consisting of
      1. a polyurethane composition prepared by reacting in a solvent a polyisocyanate, a polyoxytetramethylene glycol or a polyester glycol which has hydroxyl groups at its terminals, a low molecular weight chain-elongating agent and an aminosilane compound, and
      2. a polyurethane composition prepared by mixing an adhesive composition prepared by reacting in a solvent an aminosilane compound and an isocyanate, with a polyurethane elastomer prepared by reacting in a solvent a polyisocyanate, a polyoxytetramethylene glycol or a polyester glycol which has hydroxyl groups at its terminals, and a low molecular weight chain-elongating agent; and
   B. polyurethane composition B selected from the group consisting of
      1. a polyurethane composition prepared by reacting in a solvent a polyisocyanate, a polyoxyalkylene glycol other than polyoxytetramethylene glycols, a low molecular weight chain-elongating agent and an aminosilane compound, and
      2. a polyurethane composition prepared by mixing an adhesive composition prepared by reacting in a solvent an aminosilane compound and an isocyanate, with a polyurethane elastomer prepared by reacting in a solvent a polyisocyanate, a polyoxyalkylene glycol other than polyoxytetramethylene glycols and a low molecular weight chain-elongating agent, wherein each said low molecular weight chain-elongating agent is selected from the group consisting of a glycol, an amino-alcohol, a diamine and mixtures thereof, each said aminosilane is selected from the group consisting of N-β-(aminoethyl)-γ-aminopropyltrimethoxysilane, N-β-(aminoethyl)-γ-aminopropyltriethoxysilane, γ-aminopropyltrimethoxysilane and γ-aminopropyltriethoxysilane and is used in an amount of from 0.01 to 5.0% by weight based on solids content of the polyurethane composition in which it is contained, each said polyisocyanate is selected from the group consisting of 2,4-tolylenediisocyanate, 2,6-tolylenediisocyanate, 4,4-diphenylmethanediisocyanate, 3,3-dimethyl-4,4'-diphenylmethanediisocyanate, 1,5-naphthylenediisocyanate, 1,6-hexamethylenediisocyanate and 4,4'-dicyclohexylmethanediisocyanate and mixtures thereof, and each said isocyanate is selected from the group consisting of a polyisocyanate, a polyphenylene polymethylene polyisocyanate, phenyl isocyanate, o- and p-tolylisocyanates, o- and p-chlorophenyl isocyanates and mixtures thereof, said polyurethane composition B being present in an amount of from 0.0001 to 1 part per part of polyurethane composition A based on solids content.

2. A polyurethane mixed composition of:
A. polyurethane composition A prepared by reacting in a solvent a polyisocyanate, a polyoxytetramethylene glycol or a polyester glycol which has hydroxyl groups at its terminals, a low molecular weight chain-elongating agent and an aminosilane compound, and
B. polyurethane composition B prepared by reacting in a solvent a polyisocyanate, a polyoxyalkylene glycol other than polyoxytetramethylene glycols, a low molecular weight chain-elongating agent and an aminosilane compound, wherein each said low molecular weight chain-elongating agent is selected from the group consisting of a glycol, an amino-alcohol, a diamine and mixtures thereof, and each said aminosilane is selected from the group consisting of N-β-(aminoethyl)-γ-aminopropyltrimethoxysilane, N-β-(aminoethyl)-γ-aminopropyltriethoxysilane, γ-aminopropyltrimethoxysilane and γ-aminopropyltriethoxysilane and is used in an amount of from 0.01 to 5.0% by weight based on solids content of the polyurethane composition in which it is contained, said polyurethane composition B being present in an amount of from 0.0001 to 1 part per part of polyurethane composition A based on solids content.

3. The polyurethane composition according to claim 2 wherein a polyoxytetramethylene glycol is used in the preparation of polyurethane composition A.

4. A polyurethane composition prepared by reacting in a solvent:
a. a polyisocyanate;
b. a polyol;
c. a low molecular weight chain-elongating agent selected from the group consisting of a glycol, an amino-alcohol, a diamine and mixtures thereof;
d. from 0.01 to 5.0% by weight based on solids content of said polyurethane composition of an aminosilane selected from the group consisting of N-β-(aminoethyl)-γ-aminopropyltrimethoxysilane, N-β-(aminoethyl)-γ-aminopropyltriethoxysilane, γ-aminopropyltrimethoxysilane and γ-aminopropyltriethoxysilane; and
e. γ-glycidoxypropyltrimethoxysilane.

\* \* \* \* \*

UNITED STATES PATENT OFFICE
CERTIFICATE OF CORRECTION

PATENT NO. : 3,886,226
DATED : May 27, 1975
INVENTOR(S) : Kiyotsugu ASAI et al.

It is certified that error appears in the above-identified patent and that said Letters Patent are hereby corrected as shown below:

On the Title page:

Line [30] Foreign Application Priority Data

"Mar. 28, 1972 Japan.....47-30283"

should be:

--Feb. 17, 1972 Japan.....47-16062

Mar. 28, 1972 Japan.....47-30284

Dec. 4, 1972 Japan.....47-120715--

Signed and Sealed this

Twenty-first Day of June 1977

[SEAL]

Attest:

RUTH C. MASON
*Attesting Officer*

C. MARSHALL DANN
*Commissioner of Patents and Trademarks*